(12) United States Patent
Kim et al.

(10) Patent No.: US 8,171,546 B2
(45) Date of Patent: May 1, 2012

(54) KEYBOARD SECURITY STATUS CHECK MODULE AND METHOD

(75) Inventors: Dae Hyeong Kim, Seoul (KR); Seong Ho Cheong, Seoul (KR)

(73) Assignee: Kings Information & Network, Seoul (KR)

( * ) Notice: Subject to any disclaimer, the term of this patent is extended or adjusted under 35 U.S.C. 154(b) by 513 days.

(21) Appl. No.: 12/346,226

(22) Filed: Dec. 30, 2008

(65) Prior Publication Data

US 2010/0138918 A1    Jun. 3, 2010

(30) Foreign Application Priority Data

Nov. 28, 2008    (KR) .................. 10-2008-0119894

(51) Int. Cl.
*G06F 11/00* (2006.01)
(52) U.S. Cl. ............. 726/22; 726/19; 726/20; 726/21; 726/26; 713/1; 713/189; 710/14; 715/764; 715/771; 715/772; 715/773
(58) Field of Classification Search .............. 726/26
See application file for complete search history.

(56) References Cited

U.S. PATENT DOCUMENTS

| | | | | |
|---|---|---|---|---|
| 3,961,266 | A * | 6/1976 | Tanaka ................. | 455/182.2 |
| 6,686,904 | B1 * | 2/2004 | Sherman et al. ........ | 345/168 |
| 2003/0058215 | A1 * | 3/2003 | Yamaji et al. ........... | 345/156 |
| 2004/0205646 | A1 * | 10/2004 | Sachs et al. ............ | 715/530 |
| 2004/0215971 | A1 * | 10/2004 | Nam ...................... | 713/200 |
| 2004/0239637 | A1 * | 12/2004 | Williams et al. ........ | 345/172 |
| 2005/0143149 | A1 * | 6/2005 | Becker et al. .......... | 455/575.1 |
| 2005/0177649 | A1 * | 8/2005 | Chung Geon et al. ... | 710/1 |
| 2007/0294636 | A1 * | 12/2007 | Sullivan ................. | 715/810 |
| 2009/0251422 | A1 * | 10/2009 | Wu et al. ................ | 345/173 |
| 2010/0159996 | A1 * | 6/2010 | Rider et al. ............. | 455/566 |

FOREIGN PATENT DOCUMENTS

KR    10-0378586    11/2001

* cited by examiner

*Primary Examiner* — Edan Orgad
*Assistant Examiner* — Canh Le
(74) *Attorney, Agent, or Firm* — The Webb Law Firm

(57) ABSTRACT

A keyboard security status check module and method are provided. The module is provided to enable a user to easily check the operating status of a keyboard security program installed in a user terminal. The module includes a keyboard security monitor linked to the keyboard security program and configured to monitor a reception status of key input data protected by keyboard security, and a controller configured to display a dynamic keyboard security check representation on a screen of the user terminal according to the reception status of the key input data monitored by the keyboard security monitor.

14 Claims, 3 Drawing Sheets

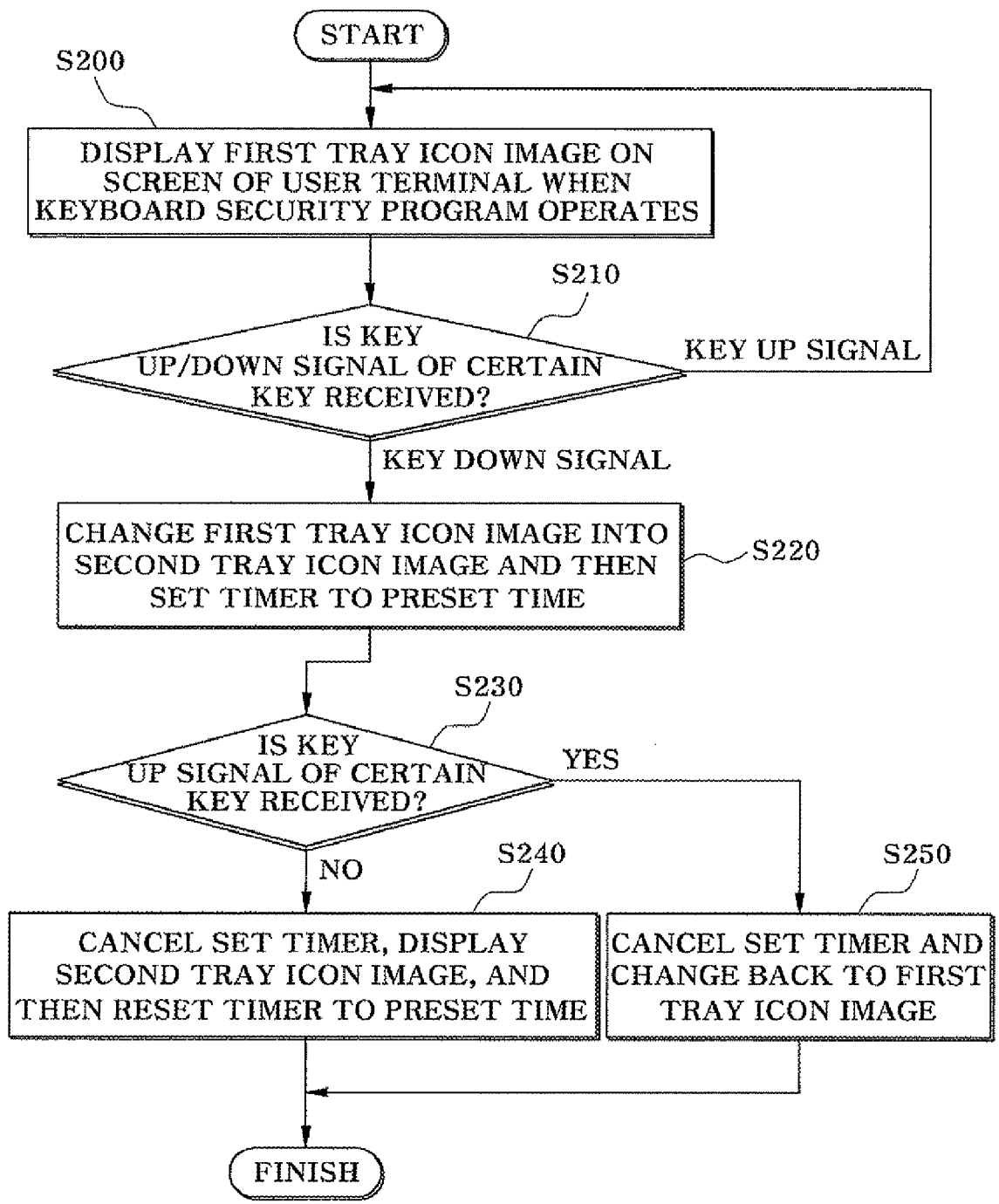

KEYBOARD SECURITY STATUS CHECK MODULE AND METHOD

CROSS-REFERENCE TO RELATED APPLICATION

This application claims priority to and the benefit of Korean Patent Application No. 2008-119894, filed on Nov. 28, 2008, the disclosure of which is incorporated herein by reference in its entirety.

BACKGROUND

1. Field of the Invention

The present invention relates to a keyboard security status check module and method, and more particularly, to a keyboard security status check module that is linked to a keyboard security program installed in a user terminal and dynamically displays a certain keyboard security check representation on a screen of the user terminal every time a user presses a key on the keyboard, thereby enabling the user to easily check the operating status of the keyboard security program, and a method thereof.

2. Discussion of Related Art

As a consequence of the rapid development of Internet and computer technology in recent years, a variety of business involving important personal information, such as Internet banking and stock transactions, is conducted through personal computers (PCs).

In order to protect such personal information, numerous conventional security technologies have been developed focusing primarily on the areas of server security and data transmission security between a user computer and a server. Data security on transmission route through the Internet now requires a new level of security requirements.

However, in personal computers (PCs) with a relatively low level of security, the number of cases of personal information being hacked and used illegally by using spyware, keystroke loggers, etc. to obtain keyboard input information is rising.

One method intended to solve this hacking problem is to install anti-virus and spyware removal tools, etc. on a personal computer (PC) to detect and remove malicious programs such as spyware.

However, when modified or newly created malicious programs appear, this method only enables appropriate action to be taken after damage is reported, and thus it has a limitation in preventing damage from occurring in the first place.

One conventional keyboard security method intended to solve this problem is disclosed in Korean Patent Publication No. 0378586, entitled "Active-X Based Keyboard Hacking Prevention Method and Apparatus." This prior publication discloses a method of protecting keyboard input information by buffering the keyboard input information, deleting keyboard trace data remaining in a keyboard port, and transferring the buffered keyboard input information through a separate transmission section, which is not conventional keyboard data flow, to an application to be displayed on an input window of the application.

Thus, conventional keyboard security means the protection of data input by a user through a keyboard from hacking tools until the data is displayed on a screen. The application of such keyboard security should not hinder or inconvenience a user inputting data through the keyboard.

For this reason, most keyboard security programs do not use a user interface (UI) or have a minimized user interface that enables on/off switching.

Meanwhile, common keyboard security programs, unlike other security programs, do not give a user any kind of signal whatsoever unless there is some special trouble. Also, it is difficult for a user to check whether keyboard security is operating normally.

SUMMARY OF THE INVENTION

The present invention is directed to a keyboard security status check module that is linked to a keyboard security program installed in a user terminal and dynamically displays a certain keyboard security check representation on a screen of the user terminal every time a user presses a key on the keyboard, thereby enabling the user to easily check the operating status of the keyboard security program, and a method thereof.

According to an aspect of the present invention, a keyboard security status check module is provided to enable a user to easily check the operating status of a keyboard security program installed in a user terminal. The keyboard security status check module includes: a keyboard security monitoring means linked to the keyboard security program and configured to monitor a reception status of key input data protected by keyboard security; and a control means configured to display a dynamic keyboard security check representation on a screen of the user terminal according to the reception status of the key input data monitored by the keyboard security monitoring means.

As the dynamic keyboard security check representation, a tray icon may be made to blink by displaying different tray icon images according to a key up/down state of a certain key, or at least one of a button, an image and a background color provided on a specific internet browser toolbar may be made to blink according to a key up/down state.

When the certain key is converted from the key up state to the key down state, a first tray icon image may be changed into a second tray icon image and then changed back to the first tray icon image after lapse of a time preset by setting a timer so that the tray icon is made to blink.

When applied to a PS/2 keyboard, when the key input data for the certain key is received again before lapse of the time preset by the timer, the set timer may be cancelled and reset to the preset time, while when the key input data for the certain key is not received again before lapse of the time preset by the timer, the second tray icon image may be changed back to the first tray icon image after lapse of the preset time.

When applied to a USB keyboard, when a key up signal of the certain key is not received before lapse of the time preset by the timer, the set timer may be cancelled and reset to the preset time after displaying the second tray icon image as is, while when the key up signal of the certain key is received before lapse of the time preset by the timer, or when in one key down signal state a down signal of another key is generated, i.e., when a user does not release a pressed key and additionally presses another key, it may be determined as the same state as when one key up signal is generated, and when the set timer is cancelled or a different key is additionally pressed, the second tray icon image may be changed back to the first tray icon image after resetting the timer.

The key input data protected by keyboard security may be input data of all keys excluding function keys.

According to another aspect of the present invention, a keyboard security status check module is provided to enable a user to easily check the operating status of a keyboard security program installed in a user terminal, wherein the keyboard security status check module is linked to the keyboard security program, and every time the user presses a key on a keyboard that corresponds to key input data protected by keyboard security, the keyboard security status check module displays a dynamic keyboard security check representation on a screen of the user terminal.

According to still another aspect of the present invention, a keyboard security status check method is provided for a user to easily check the operating status of a keyboard security program installed in a user terminal. The keyboard security status check method includes: (a) after the keyboard security program is running, monitoring a reception status of key input data protected by keyboard security; and (b) displaying a dynamic keyboard security check representation on a screen of the user terminal according to the reception status of the monitored key input data.

According to yet another aspect of the present invention, a keyboard security status check method is provided for a user to easily check the operating status of a keyboard security program installed in a user terminal. The keyboard security status check method includes: (a') while linked to the keyboard security program, every time a user presses a key on a keyboard, determining whether the pressed key corresponds to key input data protected by keyboard security; and (b') when it is determined in step (a') that the pressed key corresponds to the key input data protected by keyboard security, displaying a dynamic keyboard security check representation on a screen of the user terminal.

According to yet another embodiment of the present invention, a recording medium storing a program for executing the above keyboard security status check method is provided.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 3 is an overall flowchart of a keyboard security status check method according to another exemplary embodiment of the present invention.

DETAILED DESCRIPTION OF EXEMPLARY EMBODIMENTS

Exemplary embodiments of the present invention will be described in detail herein below with reference to the accompanying drawings. While the present invention is shown and described in connection with exemplary embodiments thereof, it will be apparent to those skilled in the art that various modifications can be made without departing from the spirit and scope of the invention.

First, the main feature of the present invention is that it shows a user that keyboard security is operating normally so that he/she may feel reassured when using a keyboard. As one example, a tray icon may blink every time the user presses a key on the keyboard.

Figure 1:
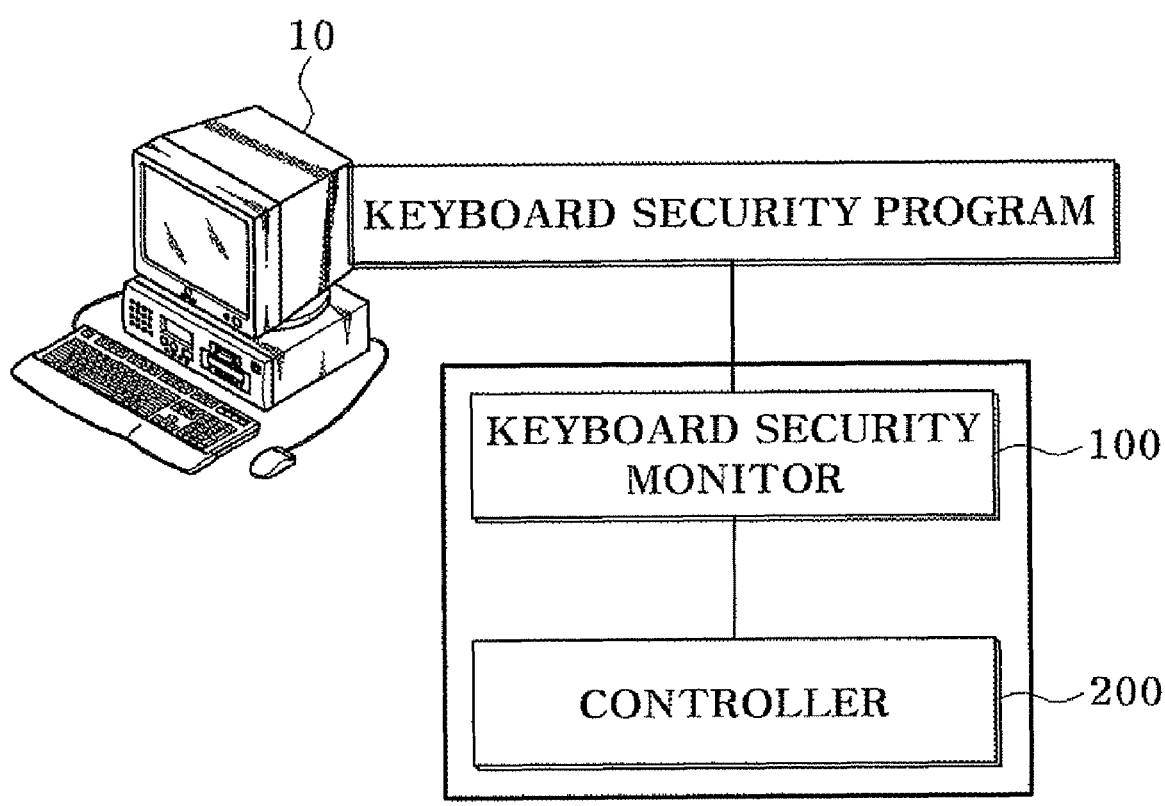
FIG. 1 is an overall block diagram of a keyboard security status check module according to an exemplary embodiment of the present invention.

FIG. 1 is an overall block diagram of a keyboard security status check module according to an exemplary embodiment of the present invention.

Referring to FIG. 1, the keyboard security status check module according to an exemplary embodiment of the present invention is installed in a user terminal 10 and includes a keyboard security monitor 100 and a controller 200.

Here, the user terminal 10 is preferably a personal computer (PC), but it is not limited to a PC and may also be any device having a communication function that is connected to the Internet and can perform communication, such a notebook computer, a personal digital assistant (PDA), a PDA phone, a digital multimedia broadcasting (DMB) phone, etc.

In the user terminal 10, a common keyboard security program for protecting key input data received from a keyboard (e.g., a PS/2 keyboard or a USB keyboard) is installed.

Here, the keyboard security program ordinarily performs processes of keyboard key input data collection, encryption, encrypted data transfer to an application, key value generation, decryption, key value substitution, etc. in a kernel. Since the keyboard security program is widely known, its detailed description will be omitted.

The keyboard security monitor 100 is linked to the keyboard security program pre-installed in the user terminal 10, and performs a function of monitoring in real-time a reception status of key input data protected by keyboard security.

Here, the key input data protected by keyboard security may be all key input data excluding function keys (e.g., Alt, Ctrl, Esc, Shift, Tab, Caps Lock, Enter, etc.).

Also, the controller 200 performs a function of displaying a dynamic keyboard security check representation on a screen of the user terminal 10 according to the reception status of key input data monitored by the keyboard security monitor 100.

Here, in the dynamic keyboard security check representation, for example, a tray icon may be made to blink by displaying different tray icon images according to a key up/down state of a certain key, or at least one of a specific button, an image and a background color provided on a tool bar may be made to blink. Thus, keyboard security status can be expressed using not only the tray icon but all control targets, etc. on a window whose color can change.

Also, when the certain key (which is protected by keyboard security) is converted from a key up state to a key down state, the controller 200 changes a first tray icon image (or a basic tray icon image) into a second tray icon image (or a press tray icon image), sets a timer, and changes the second tray icon image back to the first tray icon image after lapse of a preset time (e.g., about 70 ms). Thus, a tray icon can be made to blink every time the user presses a key on the keyboard.

Meanwhile, when the keyboard security status check module according to an embodiment of the present invention is applied to a PS/2 (personal system 2) keyboard, the controller 200 determines whether key input data protected by keyboard security is received from the keyboard security monitor 100.

When key input data of a certain key is received from the keyboard security monitor 100, that is, when there is a change from the key up state to the key down state, after running the keyboard security program installed in the user terminal 10, the initially loaded first tray icon image is changed into the second tray icon image and the timer is set to the preset time.

Next, it is determined whether key input data of the certain key is received again before the time preset by the timer. When key input data of the certain key is received again before the time preset by the timer, that is, when the certain key is pressed continuously, the set timer is cancelled and reset to the preset time, and the second tray icon image is continuously displayed on the screen of the user terminal 10.

On the other hand, when it is determined whether key input data of the certain key is not received again before the time preset by the timer, the second tray icon image is converted back to the first tray icon image after the time preset by the timer has lapsed. Thus, the tray icon can be made to blink every time the user presses a key on the keyboard.

Meanwhile, when the keyboard security status check module according to an exemplary embodiment of the present invention is applied to a USB (universal serial bus) keyboard, the controller 200 determines whether a key up/down signal of a key protected by keyboard security is received from the keyboard security monitor 100.

When a key down signal of a certain key is received from the keyboard security monitor 100, that is, when changing from a key up state to a key down state, the initially loaded first tray icon image after running the keyboard security program installed in the user terminal 10 is changed into the second tray icon image, and the timer is set to the preset time.

Next, it is determined whether the key up signal of the certain key is received before the time preset by the timer. When the key up signal of the certain key is not received before the time preset by the timer, that is, when the certain key is pressed continuously, the set timer is cancelled and the second tray icon image is displayed as is, and then the timer is reset to the preset time. Thus, the second tray icon image is continuously displayed on the screen of the user terminal 10.

On the other hand, when the key up signal of the certain key is received before the time preset by the timer, the set timer is cancelled and the second tray icon image is changed back to the first tray icon image. Thus, the tray icon can be made to blink every time the user presses a key on the keyboard.

The keyboard security status check module according to an exemplary embodiment of the present invention constituted as described above may be implemented in the form of a program, just like the keyboard security program, and installed in the user terminal 10. However, the present invention is not limited to such an implementation, and the security status check module may also be implemented in the form of hardware.

Operation of a keyboard security status check module according to an exemplary embodiment of the present invention when the above-described dynamic keyboard security check representation is implemented by a tray icon will be described in detail below.

First, appearance of the tray icon on the screen of the user terminal 10 indicates that keyboard security started normally and is ready to protect key input data of the keyboard. That is, it informs the user that a series of processes needed for keyboard security using the keyboard security program previously installed in the user terminal 10, such as start up of a keyboard security kernel driver, message hooking for hacking prevention, subclassing, etc., have been concluded normally.

Also, blinking of the tray icon indicates that key input data received from the keyboard is being protected normally. The tray icon blinks every time the user presses a key of the keyboard that corresponds to key input data protected by keyboard security. Here, since function keys (e.g., Alt, Ctrl, Esc, Shift, Tab, Caps Lock, Enter, etc.) are not protected, the tray icon does not blink when they are pressed.

Here, in order to make the tray icon blink, there are two tray icon images. One, the first tray icon image (or the basic tray icon image), shows a state in which no events whatsoever occur by the keyboard. Another one, the second tray icon image (or the press tray icon image), shows a state in which a key of the keyboard is pressed.

Thus, when the user presses and releases a key of the keyboard, the tray icon changes from the first tray icon image into the second tray icon image and back to the first tray icon image. Here, when the key of the keyboard is held in a pressed state, the second tray icon image is continuously displayed, and when the pressed key of the keyboard is released, the tray icon changes into the first tray icon image.

As described above, the expression that keyboard security is operating normally is not restricted to blinking of the tray icon and may be accomplished by several methods depending on the keyboard security program.

For example, when a user interface (UI) is made up of a toolbar, that key input data is being protected may be expressed by making a button, image, toolbar background color, etc. used on the toolbar blink. Thus, keyboard security status can be expressed using not only the tray icon but all control targets, etc. on a window whose color can change.

Also, looking at operation of the tray icon in detail, first, ordinary keyboard security involves processes of keyboard key input data collection, encryption, encrypted data transfer to an application, key value generation, decryption, key value substitution, etc. performed in a kernel.

Change of the tray icon may be determined when the key value is generated, however this is not a requirement; it does not matter at what point change of the tray icon is determined. However, the step of generating the key value is a step of recognizing that a key on the keyboard has been pressed in a window, and thus processing of keyboard security status checking according to a difference between PS/2 and USB keyboard techniques, which will be described later, can be simplified.

Meanwhile, in a basic method of changing the tray icon, when the key up state of a certain key changes to the key down state, the initially displayed first tray icon image is changed into the second tray icon image and then automatically back to the first tray icon image a fixed time later.

Of course, it is also possible to use a method in which when the key up state of the certain key changes to the key down state, the first tray icon image is changed into the second tray icon image, and when the key down state of the certain key changes back to the key up state, the original first tray icon image is restored.

Describing this in detail, in the case of application to a PS/2 keyboard, when a certain key on the keyboard is pressed, the tray icon changes from the first tray icon image into the second tray icon image, and the timer is set to the preset time (approximately 70 ms). Also, when a callback function is called according to the set timer, the tray icon changes back to the first tray icon image.

Meanwhile, if a certain key is continuously pressed, key input data of the PS/2 keyboard is generated approximately once every 30 to 50 ms while the certain key is being pressed. Since the key input data comes before the callback function of the timer is executed, in order to prevent this, the set timer is cancelled and reset to the preset time.

In that case, the callback function of the timer is not called and thus the second tray icon image of the pressed state of the certain key is continuously maintained. At this time, if the key is released, the second tray icon image changes back to the first tray icon image after lapse of the time preset by the timer (approximately 70 ms).

Meanwhile, in the case of a USB keyboard, even if a certain key is pressed continuously, key input data is not continuously generated. Therefore, blinking can be displayed by artificially generating the key value using the timer.

Figure 2:
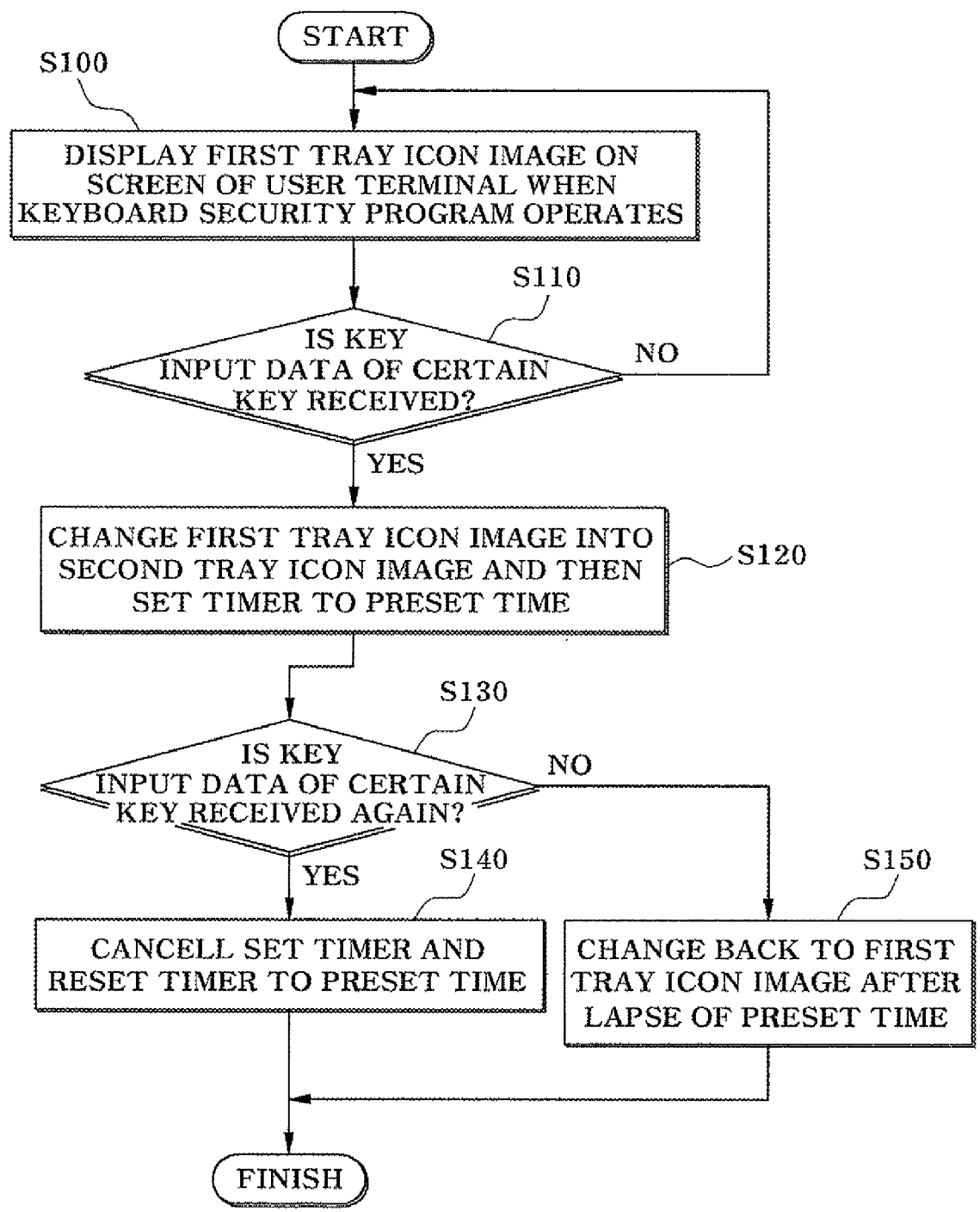
FIG. 2 is an overall flowchart of a keyboard security status check method according to an exemplary embodiment of the present invention.

FIG. 2, an overall flowchart of a keyboard security status check method according to an exemplary embodiment of the present invention, shows the case of application to a PS/2 keyboard, and elucidates operation of the controller 200, which is the subject unless stated otherwise.

Referring to FIGS. 1 and 2, first, when the keyboard security program installed in the user terminal 10 is executed, the preset first tray icon image is loaded and displayed on the screen of the user terminal 10 (S100).

Next, it is determined whether key input data for a certain key protected by keyboard security is received from the keyboard security monitor 100 (S110).

If it is determined in step S110 that key input data for the certain key is received, the initially loaded first tray icon image is changed into the second tray icon image and then the timer is set to the preset time (S120).

On the other hand, if key input data for the certain key is not received, the process is returned to step S100 and the first tray icon image is continuously displayed on the screen of the user terminal 10.

Then, it is determined whether the key input data for the certain key is received again before the time preset by the timer (S130).

If it is determined in step S130 that the key input data for the certain key is received again before the time preset by the timer, it is determined that the certain key is being pressed continuously, and the set timer is cancelled and reset to the preset time (S140). Thus, the second tray icon image is continuously displayed on the screen of the user terminal 10.

Meanwhile, if it is determined in step S130 that the key input data for the certain key is not received again before the time preset by the timer, the second tray icon image is changed back to the first tray icon image after lapse of the preset time (S150). Thus, the tray icon can be made to blink every time the user presses a key of the keyboard.

FIG. 3, an overall flowchart of a keyboard security status check method according to another exemplary embodiment of the present invention, shows the case of application to a USB keyboard, and elucidates operation of the controller 200, which is the subject unless stated otherwise.

Referring to FIGS. 1 and 3, first, when the keyboard security program installed in the user terminal 10 is executed, the preset first tray icon image is loaded and displayed on the screen of the user terminal 10 (S200).

Next, it is determined whether a key up/down signal of a certain key protected by keyboard security is received from the keyboard security monitor 100 (S210).

If it is determined in step S210 that a key down signal of the certain key is received from the keyboard security monitor 100, the initially loaded first tray icon image is changed into the second tray icon image and the timer is set to the preset time (S220).

On the other hand, if it is determined in step S210 that the key down signal of a certain key is not received, the process is returned to step S200 and the first tray icon image is continuously displayed on the screen of the user terminal 10.

Then, it is determined whether a key up signal of the certain key is received before the time preset by the timer (S230).

If it is determined in step S230 that the key up signal of the certain key is not received before the time preset by the timer, it is determined that the certain key is being pressed continuously, and the set timer is cancelled and reset to the preset time after displaying the second tray icon image as is (S240). Thus, the second tray icon image is continuously displayed on the screen of the user terminal 10.

On the other hand, if it is determined in step S230 that the key up signal of the certain key is received again before the time preset by the timer, the set timer is cancelled and the second tray icon image is changed back to the first tray icon image (S250). Thus, the tray icon can be made to blink every time the user presses a key of the keyboard.

Meanwhile, it is also possible for the keyboard security status check method according to an exemplary embodiment of the present invention to be embodied as a computer-readable code stored on a computer-readable recording medium. The computer-readable recording medium may be any kind of recording medium or device that stores data that can be read by a computer system.

Examples of computer-readable recording media are ROM, RAM, CD-ROM, magnetic tape, hard disks, floppy disks, mobile storage devices, flash memory, optical data storage devices, etc. In addition, the computer-readable recording medium may also be realized in the form of carrier waves (e.g., transmission over the Internet).

In addition, the computer-readable recording medium may be distributed in computer systems connected via a computer network to store and execute the code which can be read in a distributed fashion.

According to the above-described keyboard security status check module and method of the present invention, by being linked to a keyboard security program installed in a user terminal and dynamically displaying a certain keyboard security check representation on a screen of the user terminal every time a user presses a key on the keyboard, the user can easily check the operating status of the keyboard security program.

While a keyboard security status check module and method according the present invention have been described with reference to exemplary embodiments thereof, it will be apparent to those of ordinary skill in the art that various changes can be made therein without departing from the spirit and scope of the invention as defined by the appended claims.

What is claimed is:

1. A keyboard security status check software application stored on a non-transitory computer-readable storage medium, provided to enable a user to easily check an operating status of a keyboard security program installed in a user terminal, the keyboard security status check software application comprises computer executable instructions that when executed by a computing device, cause the computing device to perform the steps of:
monitoring linked to the keyboard security program and monitoring a reception status of key input data protected by keyboard security; and
displaying a dynamic keyboard security check representation on a screen of the user terminal according to the reception status of the key input data monitored by the keyboard security program,
wherein the dynamic keyboard security check representation comprises a first tray icon image and a second tray icon image, and
the step of displaying a dynamic keyboard security check representation comprises:
providing the first tray icon image on the screen of the user terminal to indicate that the keyboard security program started normally and is ready to protect key input data;
displaying the second tray icon image once a key is pressed; and
displaying the first icon image once the key is released such that a blinking image is produced indicating that key input data is being protected normally.

2. The keyboard security status check software application of claim 1, wherein as the dynamic keyboard security check representation, a tray icon is made to blink by displaying different tray icon images according to a key pressed/released state of a certain key, or at least one of a button, an image and a background color provided on a specific internet browser toolbar is made to blink.

3. The keyboard security status check software application of claim 2, wherein when the certain key is converted from the key released state to the key pressed state, a first tray icon image is changed into a second tray icon image and then changed back to the first tray icon image after lapse of a time preset by setting a timer, so that the tray icon is made to blink.

4. The keyboard security status check software application of claim 3, wherein when the key input data for the certain key is received again before lapse of the time preset by the timer, the set timer is cancelled and reset to the preset time, while when the key input data for the certain key is not received again before lapse of the time preset by the timer, the second tray icon image is changed back to the first tray icon image after lapse of the preset time.

5. The keyboard security status check software application of claim 3, wherein when a key released signal of the certain key is not received before lapse of the time preset by the timer, the set timer is cancelled and reset to the preset time after displaying the second tray icon image as is, while when the key released signal of the certain key is received before lapse of the time preset by the timer, the set timer is cancelled and the second tray icon image is changed back to the first tray icon image.

6. The keyboard security status check software application of claim 1, wherein the key input data protected by keyboard security is input data of all keys excluding function keys.

7. A keyboard security status check method provided for a user to easily check an operating status of a keyboard security program installed in a user terminal, the method comprising:
 (a) after the keyboard security program is running, monitoring a reception status of key input data protected by keyboard security; and
 (b) displaying a dynamic keyboard security check representation on a screen of the user terminal according to the reception status of the monitored key input data,
 wherein the dynamic keyboard security check representation comprises a first tray icon image and a second tray icon image, and
 the step of displaying a dynamic keyboard security check representation comprises:
  providing the first tray icon image on the screen of the user terminal to indicate that the keyboard security program started normally and is ready to protect key input data;
  displaying the second tray icon image once a key is pressed; and
  displaying the first icon image once the key is released such that a blinking image is produced indicating that key input data is being protected normally.

8. The keyboard security status check method of claim 7, wherein as the dynamic keyboard security check representation, a tray icon is made to blink by displaying different tray icon images according to a key pressed/released state of a certain key, or at least one of a button, an image and a background color provided on a specific internet browser toolbar is made to blink.

9. The keyboard security status check method of claim 8, wherein when the certain key is converted from the key released state to the key pressed state, a first tray icon image is changed into a second tray icon image and then changed back to the first tray icon image after lapse of a time preset by setting a timer, so that the tray icon is made to blink.

10. The keyboard security status check method of claim 9, wherein when the key input data for the certain key is received again before lapse of the time preset by the timer, the set timer is cancelled and reset to the preset time, while when the key input data for the certain key is not received again before lapse of the time preset by the timer, the second tray icon image is changed back to the first tray icon image after lapse of the preset time.

11. The keyboard security status check method of claim 9, wherein when a key released signal of the certain key is not received before lapse of the time preset by the timer, the set timer is cancelled and reset to the preset time after displaying the second tray icon image as is, while when the key released signal of the certain key is received before lapse of the time preset by the timer, the set timer is cancelled and the second tray icon image is changed back to the first tray icon image.

12. A keyboard security status check method provided for a user to easily check an operating status of a keyboard security program installed in a user terminal, the method comprising:
 (a') while linked to the keyboard security program, every time a user presses a key on a keyboard, determining whether the pressed key corresponds to key input data protected by keyboard security; and
 (b') when it is determined in step (a') that the pressed key corresponds to the key input data protected by keyboard security, displaying a dynamic keyboard security check representation on a screen of the user terminal,
 wherein the dynamic keyboard security check representation comprises a first tray icon image and a second tray icon image, and
 the step (b') of displaying a dynamic keyboard security check representation comprises:
  providing the first tray icon image on the screen of the user terminal to indicate that the keyboard security program started normally and is ready to protect key input data;
  displaying the second tray icon image once a key is pressed; and
  displaying the first icon image once the key is released such that a blinking image is produced indicating that key input data is being protected normally.

13. The keyboard security status check method of claim 12, wherein as the dynamic keyboard security check representation, a tray icon is made to blink by displaying different tray icon images according to a key pressed/released state of a certain key, or at least one of a button, an image and a background color provided in a specific tool bar is made to blink.

14. A non-transitory computer-readable storage medium storing a program, which when executed by a computer device, causes the computer device to perform the method of claim 7 to be executed on a computer.

* * * * *